(12) United States Patent
Aggarwal et al.

(10) Patent No.: US 6,778,688 B2
(45) Date of Patent: Aug. 17, 2004

(54) REMOTE AUTHENTICATION OF FINGERPRINTS OVER AN INSECURE NETWORK

(75) Inventors: Pooja Aggarwal, San Deigo, CA (US); Krishnendu Chatterjee, West Bengal (IN); Pradeep Kumar Dubey, New Delhi (IN); Charanjit Singh Jutla, Elmsford, NY (US); Vijay Kumar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 09/848,887

(22) Filed: May 4, 2001

(65) Prior Publication Data

US 2002/0164058 A1 Nov. 7, 2002

(51) Int. Cl.[7] ................................................. G06K 9/00
(52) U.S. Cl. ....................................... 382/125; 713/186
(58) Field of Search ................................. 382/115, 116, 382/124–127; 283/67, 68, 69; 356/71, 73; 235/380, 382, 382.5; 340/5.53, 5.83; 902/3–6; 713/182, 186; 700/94

(56) References Cited

U.S. PATENT DOCUMENTS 5,917,928 A    6/1999  Shpuntov et al.
6,038,666 A    3/2000  Hsu et al.
6,597,802 B1 * 7/2003  Bolle et al. ................. 382/124
2003/0055516 A1 * 3/2003  Gang et al. ................... 700/94
2003/0159051 A1 * 8/2003  Hollnagel .................... 713/186

FOREIGN PATENT DOCUMENTS

WO    WO9812670 A1    3/1998    ............ G07C/9/00
WO    WO9825385 A1    6/1998    ............ G06F/1/00
WO    WO035135 A1     6/2000    ............ H04K/1/00

* cited by examiner

*Primary Examiner*—Vikkram Bali
(74) *Attorney, Agent, or Firm*—McGinn & Gibb, PLLC; T. Rao Coca, Esq.

(57) ABSTRACT

The present invention relates to a method, system and computer program product for enabling the remote authentication of fingerprints over an insecure network using a client-server architecture by generation of a set of random queries relating to fingerprint patterns based on stored fingerprint data at the server, to which the client responds based on the observed fingerprint patterns, followed by the issuing of a randomly generates set of challenges pertaining to geometrical relationships between the fingerprint patterns for which confirm responses are received by their server, the final authentication being determined by the proportion of correct responses by the client to said challenges.

36 Claims, 5 Drawing Sheets

Fig. 1. Challenge-Response sequence between prover and verifier

Fig.2. Client module

Fig. 3: Matching queries

Fig.4. Server module

Fig. 5: selection of angles

REMOTE AUTHENTICATION OF FINGERPRINTS OVER AN INSECURE NETWORK

FIELD OF THE INVENTION

The present invention relates to remote authentication of fingerprints over an insecure network using client-server architecture. It generally relates to the problem of authenticating a person based on that person's fingerprint, and more specifically to the problem of achieving such authentication by means of communication over an insecure network or channel in such a manner that an eavesdropper who intends to later impersonate the user does not gain any advantage by obtaining a transcript of the communication involved in the process of authentication.

BACKGROUND OF THE INVENTION

Business processes often require authentication of one or more business entities. At the same time, digital technology has also given rise to new applications for authentication, such as of computer users, credit-card users and so forth. There is an increasing use of various biometrics in such authentication processes. With the widespread use of networking, many of these applications involve authentication over a communication network, where several security- and privacy-related issues arise. With this spread in networking, biometrics has moved from simple desktop implementations to network-authentication systems, involving firewalls and multiple operating platforms. Fingerprints constitute the most popular among the biometrics in use. One of the most important weaknesses of current biometric authentication mechanisms lies in the digital representation of the biometric indicator. If the digital representation of the biometric is made available to a network intruder during an authentication process, the security of the business process may be permanently compromised, since, a biometric indicator is generally unary to begin with (i.e., all of us have only one left thumbprint). Unlike passwords, one cannot keep changing the biometric under use. All prior art methods of fingerprint authentication over a network involve sending the digital representation of all or some part of the fingerprint in some form, which if deciphered, could reduce the offered security to an unacceptably low level, thus disrupting the business method.

The use of encryption is one response to the need for security and privacy in communication. More specifically, such methods involve the use of coding or encryption in the transmission of data, and are secure only as long as such coding or encryption is not broken by an adversary.

Some inventions describing various techniques for enabling the use of biometrics for authentication over a network are given below:

In U.S. Pat. No. 5,917,928: System and method for automatically verifying identity of a subject, certain reference segments are obtained from a reference image, and then during the verification process, the reference segments are used to select a portion of the presented image for pixel-by-pixel comparison with the reference image.

In WO035135A1: SECURE SYSTEM USING CONTINUOUSLY-CHANGING FEATURES OF A BODY PART AS A KEY, a portion of the fingerprint image is transmitted for each verification, and the transmitted portion changes from one verification to the next. This is to ensure that an eavesdropper only acquires a portion of the image each time.

In WO9825385A1: METHOD AND SYSTEM FOR IMPROVING SECURITY IN NETWORK APPLICATIONS (Also U.S. Pat. No. 6,076,167), biometric information is used to authenticate a user at the beginning of a communication session, but it is assumed that a secure channel is available to transmit such information. More specifically, the communication between the two parties is encrypted.

WO9812670A1: BIOMETRIC IDENTIFICATION SYSTEM FOR PROVIDING SECURE ACCESS proposes a device for capturing and transmitting encoded biometric information to a receiver for various applications.

U.S. Pat. No. 6,038,666: Remote identity verification technique using a personal identification also proposes to use biometric data for authentication, but it also proposes the transmission in encrypted form (that is, the security of the invention relies upon the security of the channel of communication).

All these inventions rely on the use of encryption for security during authentication. However, there are several situations where security needs may not be fully met by encryption. Firstly, encryption has certain costs in terms of processing speed, computing power and cost of equipment, and these costs may be either a barrier or an avoidable burden in many applications. Secondly, the use of encryption may place a burden of remembering keys, keeping keys secure and using encryption in a secure and non-compromising fashion upon the user. Technically non-proficient and potentially forgetful or careless users give rise to several security weaknesses. Finally, relying totally upon the security of a network requires the user to trust the providers of the encryption machinery, keys and other encryption infrastructure, means of communication, etc. In addition to being a security concern, such trust may not be desirable when some or all of these parties may have conflicts of interest with the user.

There is, therefore, a need for a means of fingerprint-based authentication that can operate in a secure and trustworthy fashion over a communication channel or network that does not guarantee the security or privacy of communication. In this invention we propose a system and method for such authentication. Here we are achieving two purposes: high-accuracy authentication using fingerprints, and not revealing the fingerprint (or essential information related to the fingerprint) while carrying out the former function.

OBJECTS AND SUMMARY OF THE INVENTION

The object of this invention is to provide an improved system and method for authentication using fingerprints.

Second object of this invention is to provide an improved system and method of authentication using fingerprints with increased security.

Third object of this invention is to provide an improved system and method for authentication using fingerprints without revealing the fingerprint.

Another object of this invention is to provide an improved system and method of authentication using fingerprints where the authenticating party, called the server, and the party to be authenticated, called the user, communicate with each other remotely over a communication channel or network.

Yet another object of this invention is to provide an improved system and method of secure authentication using fingerprints where the server and the user communicate over an insecure communication channel or network.

Further object of this invention is to provide an improved network-based business method where business partners can be authenticated securely even when the security of the network has been compromised.

To achieve the said objectives the invention provides a method for enabling the remote authentication of fingerprints over an insecure network using a client-server architecture, comprising:

transmitting the identity of the finger-print source to the server, retrieving the fingerprint pattern data of the fingerprint source from the fingerprint data-base at the server, transmitting a set of queries, each of which is derived from a randomly selected set of fingerprint pattern elements in said fingerprint pattern, to said client, comparing the received set of queries against the observed fingerprint pattern at the client, transmitting the identities of those queries to the server for which a match is observed by the client provided at least a defined minimum number of queries are verified, generating a set of challenges pertaining to defined physical relationships between fingerprint pattern elements in the identified queries, transmitting said challenges to said client, responding to said challenges based on observed fingerprint patterns at the client, and confirming authentication provided at least a defined minimum proportion of responses are determined to be correct by the server.

The said identities are the indices of those queries for which a fingerprint pattern match is observed by said client.

Each of the said queries consists of geometric information about the corresponding randomly selected set of fingerprint pattern elements.

Each of said queries consists of distances between pairs of fingerprint pattern elements.

Each of the said queries consists of the distances from a chosen fingerprint pattern element to each of the other fingerprint pattern elements.

The said distance is the Euclidean distance or the Ridge-Count distance between said two points or a cartesian pair of values, the two values being the Euclidean and the Ridge-Count distances respectively.

Each of the said challenges pertains to a geometric relationship between fingerprint pattern elements in the identified queries.

The said client attempts to maximize the number of correct responses to said challenges.

The minimum number of matches to said queries is 3 and said challenges are constructed by grouping the elements of said identified or matched queries into ordered 3-tuples each containing one element respectively from the 3 identified queries, the correct response to which is the angle formed by connecting the 3 points in said 3-tuple in a predefined sequence.

In order to make the protocol more robust to noisy inputs, the minimum number of matches to said queries is increased to 6 and said challenges are constructed by picking 6 pattern elements, one from each query and selecting 4 angles formed by these 6 elements, chosen in a manner devised not to reveal any useful information about said fingerprint to an eavesdropper.

In order to improve security, said queries are transmitted as pairs of vectors with the second vector in the pair being permuted in accordance with a secret permutation known only to said client and said server, with the client de-permuting said vector of each query prior to processing.

To improve accuracy by rejecting spurious patterns said server acquires several images of the fingerprint of the user at the time of registration, said fingerprint patterns are considered pair wise, and the fingerprint pattern elements present in one image are matched with corresponding elements in the other, and only those elements that match are stored in said fingerprint database at the server.

The instant invention also provides a system for enabling the remote authentication of fingerprints over an insecure network using a client-server architecture, comprising:

means for transmitting the identity of the finger-print source to the server, means for retrieving the fingerprint pattern data of the fingerprint source from the fingerprint data-base at the server, means for transmitting a set of queries, each of which is derived from a randomly selected set of fingerprint pattern elements in said fingerprint pattern, to said client, means for comparing the received set of queries against the observed fingerprint pattern at the client, means for transmitting the identities of those queries to the server for which a match is observed by the client provided at least a defined minimum number of queries are verified, means for generating a set of challenges pertaining to defined physical relationships between fingerprint pattern elements in the identified queries, means for transmitting said challenges to said client, means for responding to said challenges based on observed fingerprint patterns at the client, and means for confirming authentication provided at least a defined minimum proportion of responses are determined to be correct by the server.

The said identities are the indices of those queries for which a fingerprint pattern match is observed by said client.

The means for transmitting queries uses the geometric information about the corresponding randomly selected set of fingerprint pattern elements.

The means for transmitting queries uses the distances between pairs of fingerprint pattern elements.

The said means for transmitting queries uses the distances from a chosen fingerprint pattern element to each of the other fingerprint pattern elements.

The said distance is the Euclidean distance or the Ridge-Count distance between said two points or a cartesian pair of values, the two values being the Euclidean and the Ridge-Count distances respectively.

The said means for generating challenges uses a geometric relationship between fingerprint pattern elements in the identified queries.

The said client attempts to maximize the number of correct responses to said challenges.

The minimum number of matches to said queries is 3 and said means for generating challenges groups the elements of said identified matched queries into ordered 3-tuples each containing one element respectively from the 3 identified queries, the correct response to which is the angle formed by connecting the 3 points in said 3-tuple in a predefined sequence.

In order to make the protocol more robust to noisy inputs the minimum number of matches to said queries is increased to 6 and said means for generating challenges picks 6 pattern elements, one from each query and select 4 angles formed by these 6 elements, chosen in a manner devised not to reveal any useful information about said fingerprint to an eavesdropper.

In order to improve security, said means for transmitting queries constructs queries as a pair of vectors with the second vector in the pair being permuted in accordance with a secret permutation known only to said client and said server, with the client de-permuting said vector of each query prior to processing.

To improve accuracy by rejecting spurious patterns said server acquires several images of the fingerprint of the user at the time of registration includes means for considering said fingerprint patterns pair wise, and the means for matching the fingerprint pattern elements present in one image with corresponding elements in the other, said server storing only those elements that match in said fingerprint database.

The instant invention further provides a computer program product comprising computer readable program code stored on computer readable storage medium embodied therein for enabling the remote authentication of fingerprints over an insecure network using a client-server architecture, comprising:

computer readable program code means configured for transmitting the identity of the finger-print source to the server, computer readable program code means configured for retrieving the fingerprint pattern data of the fingerprint source from the fingerprint data-base at the server, computer readable program code means configured for transmitting a set of queries, each of which is derived from a randomly selected set of fingerprint pattern elements in said fingerprint pattern, to said client, computer readable program code means configured for comparing the received set of queries against the observed fingerprint pattern at the client, computer readable program code means configured for transmitting the identities of said queries to the server for which a match is observed by the client provided at least a defined minimum number of queries are verified, computer readable program code means configured for generating a set of challenges pertaining to defined physical relationships between fingerprint pattern elements in the identified queries, computer readable program code means configured for transmitting said challenges to said client, computer readable program code means configured for responding to said challenges based on observed fingerprint patterns at the client, and computer readable program code means configured for confirming authentication provided at least a defined minimum proportion of responses are determined to be correct by the server.

The said identities are the indices of those queries for which a fingerprint pattern match is observed by said client.

The said computer readable program code means configured for transmitting queries uses the geometric information about the corresponding randomly selected set of fingerprint pattern elements.

The said computer readable program code means configured for transmitting queries uses the distances between pairs of fingerprint pattern elements.

The said computer readable program code means configured for transmitting queries uses the distances from a chosen fingerprint pattern element to each of the other fingerprint pattern elements.

The said distance is the Euclidean distance or the Ridge-Count distance between said two points or a cartesian pair of values, the two values being the Euclidean and the Ridge-Count distances respectively.

The said means for generating challenges pertains to a geometric relationship between fingerprint pattern elements in the identified queries.

The said client attempts to maximize the number of responses to said challenges.

The minimum number of matches to said queries is 3 and said computer readable program code means configured for generating challenges groups the elements of said identified matched queries into ordered 3-tuples each containing one element respectively from the 3 identified queries, the correct response to which is the angle formed by connecting the 3 points in said 3-tuple in a predefined sequence.

In order to make the protocol more robust to noisy inputs the minimum number of matches to said queries is increased to 6 and said computer readable program code means configured for generating challenges picks 6 pattern elements, one from each query and select 4 angles formed by these 6 elements, chosen in a manner devised not to reveal any useful information about said fingerprint to an eavesdropper.

In order to improve security said computer readable program code means configured for transmitting queries constructs queries as pairs of vectors with the second vector in the pair being permuted in accordance with a secret permutation known only to said client and said server, with the client de-permuting said vector of each query prior to processing.

To improve accuracy by rejecting spurious patterns said server acquires several images of the fingerprint of the user at the time of registration includes computer readable program code means configured for considering said fingerprint patterns pair wise, and the computer readable program code means for matching the fingerprint pattern elements present in one image with corresponding elements in the other, said server storing only those elements that match in said fingerprint database.

BRIEF DESCRIPTION OF THE DRAWINGS

The invention will now be described with reference to the accompanying drawings.

DETAILED DESCRIPTION OF THE DRAWINGS

Figure 1:
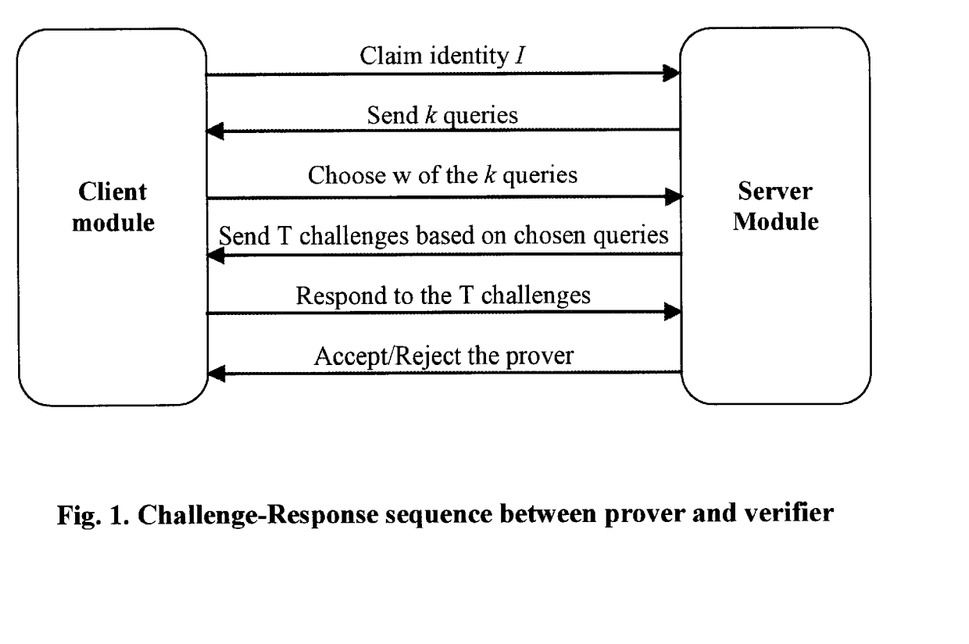
FIG. 1 shows the system, according to this invention.

FIG. 1 shows the system according to this invention consisting of two parts, a Client and a Server connected over an insecure network. A database of the fingerprints of all registered users is hosted by the server. The server is assumed to be secure. The client and the communication medium are assumed to be insecure. The aim is to authenticate any person claiming identity I by verifying the fingerprint(s) he gives at the client with that present in the server database. The client and the server module communicate with each other to achieve this verification, the client being the prover and the server being the verifier. The protocol proposed assumes an open channel of communication between the client and the server and aims to ensure that an eavesdropper does not get any valuable information that might enable him to impersonate the person with identity I.

The basic protocol is based on a challenge-response sequence between the client and the server.

1. The protocol begins with the client claiming identity I.
2. The server retrieves the local template L of I's enrolled fingerprint from its database and constructs a set of k patterns, each of which is a set of minutiae from L (explained in detail below) from L. These k patterns are the queries that are then sent to the client.
3. In the query template L' at the client, for each of the k patterns received, the client tries to find a match. The notion of a match will be specified in a following section. It sends to the server the indices of a subset of the k patterns it was able to match most successfully. We call this subset S.
4. The server then constructs a set of challenges related to the patterns in S and sends these challenges to the client.
5. The client answers these challenges to the best of its capability.
6. Based on the correctness of the client responses, the server decides whether the client's claim of identity is validated.

Figure 2:
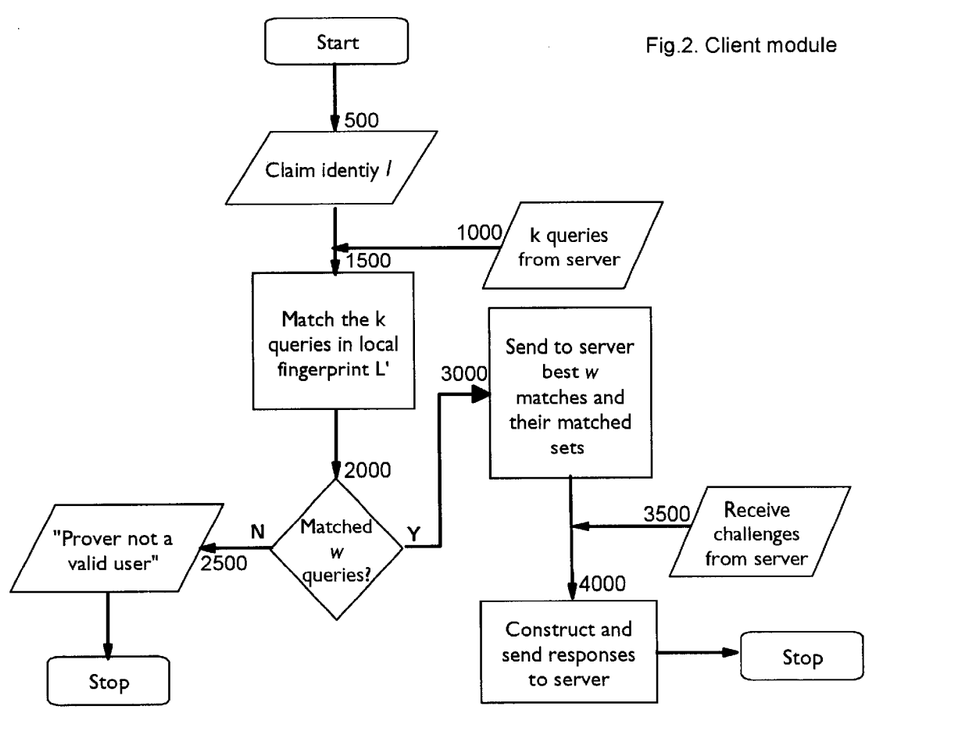
FIG. 2 shows the flow diagram of the operations at the client.

FIG. 2 shows the flow diagram of the operations at the client. A user that enters the system gives his fingerprint and claimed identity to the client software. The protocol begins with the client communicating the user's claim to identity I to the server in function block 500.

The execution of the client module then waits for the server to communicate a set of k queries to it in function block 1000.

The execution then proceeds to function block 1500 of the client module. After processing all queries, execution continues to function block 2000 where the client counts the number of queries it was able to match. If the number of matched queries is below a threshold w (in our preferred embodiment this threshold is 3), the user has failed to prove his identity and execution proceeds to function block 2500 where a failure message is displayed to the user. Otherwise execution proceeds to function block 3000 where the client discloses to the server the w best matched sets. A matched set is revealed by specifying which query it corresponds to, as well as the index numbers of all its elements. This is the subset S. In our preferred embodiment the set S consists of the three matched sets, corresponding to some three queries i, j and k.

The execution stream at the client again goes into a wait, and resumes when the client gets a set of challenges from the server in function block 3500. Each challenge is a subset of the union of the matched sets that were sent by the client. In response, the client must compute and transmit some property of this subset. In our preferred embodiment, every challenge contains one point from each of the three matched sets sent by the client. Thus, the challenges are of the form $(N(Q_a^i), N(Q_b^j), N(Q_c^k))$. In response to such a challenge, the client computes and sends $\phi$, is the angle formed by connecting $Q_a^i$ and $Q_b^j$ to $Q_c^k$. This takes place in function block 4000.

The server communicates the success or failure of the verification to the client, which the client communicates to the user.

A query consists of information about a geometric pattern consisting of some subset of the minutiae in L. In our preferred embodiment, the $i^{th}$ pattern is a collection of r+1 minutiae points, $\{p^i_0, p^i_1, p^1_2, \ldots, p^i_r\}$. For purposes of security, these minutiae are chosen uniformly at random from the minutiae in L. The $i^{th}$ query is the vector $(d^i_1, d^i_2, \ldots, d^i_r)$, where $d^i_j$ is the distance between $p^i_0$ and $p^i_j$. While many different measures of distance such as the Euclidean distance and the ridge-count distance (the ridge-count distance between two points in a fingerprint is the number of ridges that cross a line joining those two points), or combinations thereof may be used, in our preferred embodiment we use a distance measure which is a Cartesian pair of values, the two values being the Euclidean and the ridge-count distances, respectively.

Upon receiving query i, the client tries to match it in L'. That is to say, it tries to find a set of points $X=\{q^i_0, q^i_1, q^i_2, \ldots, q^i_s\}$ in L' and a subset Y of the query of size s, such that the sets X and Y are similar in some geometric sense, and s is maximized. In our preferred embodiment, the client attempts to find a set $\{q^i_0, q^i_1, q^i_2, \ldots, q^i_s\}$ of minutiae in L' and a one-to-one mapping $f$ from [1,s] to [1,r] such that for all j in the range [1,s], the distance from $q^i_j$ to $q^i_0$ equals $d^i_{f(j)}$ (within a specified tolerance). Such a set is called a candidate match for the query. The client finds the largest such set. If s, the size of the largest candidate match, exceeds a specified threshold t, the query is said to match with $\{q^i_0, q^i_1, q^i_2, \ldots, q^i_s\}$—otherwise it is not matched. $N(q^i_j)$, the index number of $q^i_j$ is defined to be f(j).

Figure 3:
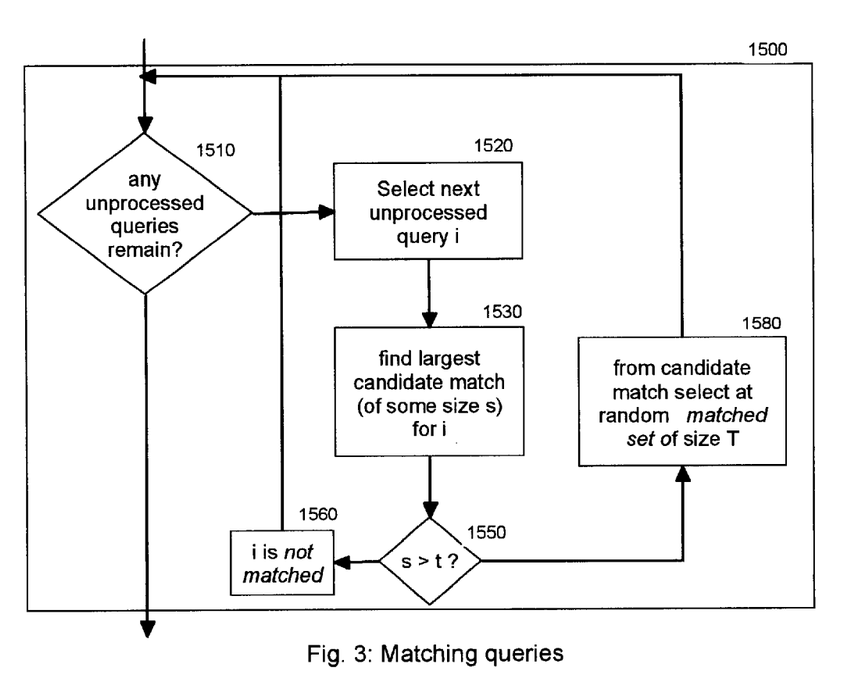
FIG. 3 shows the flow diagram of the operations at the client for processing of queries.

FIG. 3 shows the flow diagram of the operations at the client for processing of queries. The client receives k queries. These queries are processed one at a time. The execution begins in decision block 1510 where the client checks if there are any remaining queries not processed yet. If there are no remaining unprocessed queries execution continues, else it continues to function block 1520 where the client selects the next query i to be processed. Next, in function block 1530, the client finds the largest candidate match (of some size s) for this query. In decision block 1550, the client checks if s>t. If not, query i is not matched, otherwise it is matched and in function block 1580 the client selects the matched set for query i—a subset $Q_1^i, Q_2^i, \ldots Q_T^i$ of $q^i_0, q^i_1, q^i_2, \ldots, q^i_s$. Next, execution moves back to decision block 1510.

Figure 4:
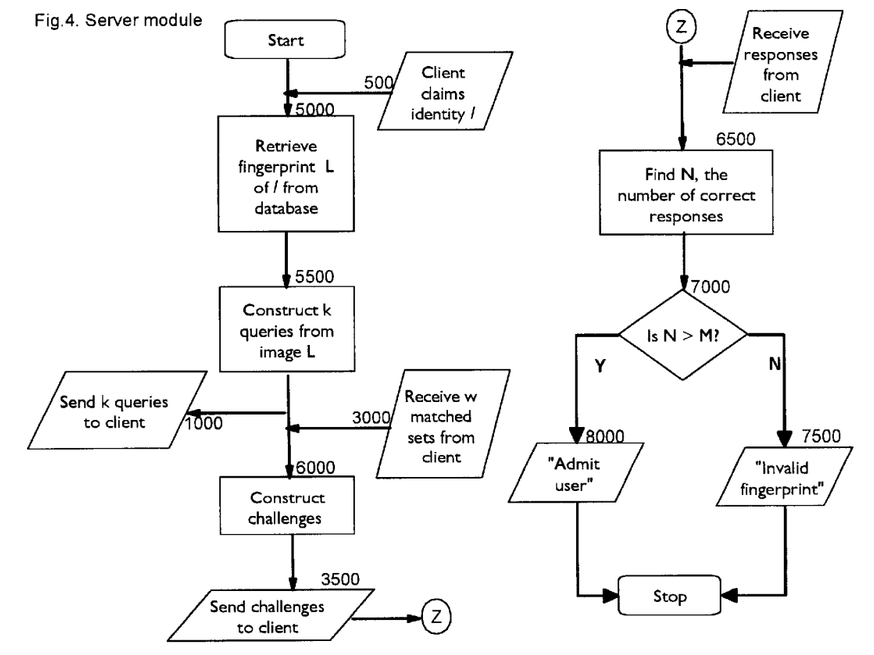
FIG. 4 shows the flow diagram of the operations of the server.

FIG. 4 shows the flow diagram of the operation of the server. Initially the server waits for the client to communicate to it its claim to identity I in function block 500. Execution continues to function block 5000 where the server retrieves the fingerprint L corresponding to I from its database.

The execution then proceeds to function block 5500 where L is used to build k queries as described above. Next, the execution proceeds to function block 1000 where the server sends this set of k queries to the client.

When the client responds with the indices of w queries (the set S) and the corresponding matched sets, the execution proceeds to function block 6000 where the server constructs T challenges from S. The server groups the elements of the w matched sets into groups or patterns. In our preferred embodiment, these elements are grouped into T ordered 3-tuples, each of the form $(Q_a^i, Q_b^j, Q_c^k)$. Each 3-tuple contains one element respectively from the 3 matched sets (as noted previously, w=3 in our preferred embodiment). Each such 3-tuple is a challenge, the correct response to which would be θ, the angle formed by connecting $Q_a^i$ and $Q_b^j$ to $Q_c^k$.

Having constructed the challenges, execution proceeds to function block 3500 where the server challenges the client to disclose the angles between ($N(p_a^i)$, $N(p_b^j)$, $N(p_c^k)$). For example, a challenge could translate as follows: "Disclose the angle between the 3rd point in the 2nd query, the 7th point in the 5th query and the 6th point in the 1st query."

In function block 4000 the client sends responds with an angle for each challenge. Execution of the server module continues to function block 6500 where the server counts the number of correct replies from the client. For a challenge for which the clients sends an angle $\phi$, and for which the correct response is $\theta$, then the server accepts the response as correct if the difference between $\theta$ and $\phi$ is small (that is, abs $(\phi-\theta)<A$, where A is some chosen threshold); else it considers the response incorrect.

The execution then reaches decision block 7000, where the server checks if the number of correct responses exceeds M, where M is another chosen threshold. If so, the client is authenticated 8000. Autherwise, the server declares that authentication has failed 7500. The server communicates the appropriate decision to the client and then terminates.

Figure 5:
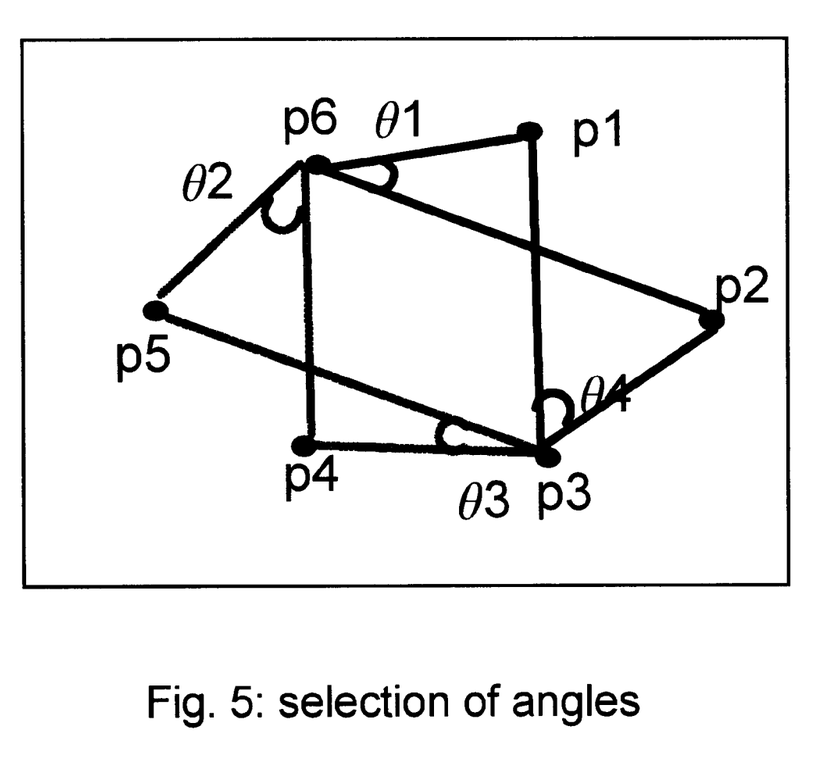
FIG. 5 shows variations of the process for generation of queries at the server.

FIG. 5 shows the use of multiple angles that are used for the construction of queries in a variation (Variation-1) of the process for generation of queries at the server. This variation is motivated by the need to make the protocol more robust to noisy inputs, where many of the minutiae returned by the client's minutiae detecting software returns are spurious.

The value of the minimum number of matched pattern element 'w' is increased to 6—the client identifies selects six queries and sends the corresponding matched sets to the server. The server then picks 6 minutiae say $p_1, p_2, p_3, p_4, p_5, p_6$, one from each of the identified queries, and selects 4 angles formed by these 6 minutiae. The 4 angles between the 6 minutiae are chosen in a particular manner, which is devised not to reveal any useful information about the finger print to an eavesdropper. This rule for selecting angles illustrated in FIG. 5.

The rest of the protocol remains unchanged.

Another variation (variation 2) of the query generation process seeks to reduce errors. Consider the case when there are 2 points which are at the same distance/ridge counts away from the center. i.e. both $q_1$ and $q_2$ are at the same distance/ridge counts from $q_0$. In such a case the client might include $q_1$ in a candidate match even though it would have been "correct" to include $q_2$ instead. Variation 2 is motivated by the need to avoid such errors.

In this variation, query I is formed, using the distances of a set of r minutiae, selected uniformly and at random, from 2 different points, $p^i_0$ and $v^i$. We first randomly select $p^i_0, v^i, p^i_1, p^i_2, \ldots, p^i_r\}$, and then construct the query as a pair of vectors, $(d^i_1, d^i_2, \ldots, d^i_r), (D^i_1, D^i_2, \ldots, D^i_r))$, where $d^i_j$ is the distance between $p^i_0$ and $p^i_j$, and $D^i_j$ is the distance between $v^i$ and $p^i_j$. Now a candidate match is of the form $\{q^i_0, z^i, q^i_1, q^i_2, \ldots, q^i_s\}$, such that for all j, the distance from $q^i_j$ to $q^i_0$ equals $d^i_{f(j)}$, and the distance from $q^i_j$ to $z^i$ equals $D^i_{f(j)}$ (both within specified tolerances).

All the other elements of the protocol remain unchanged.

In general, Variation 2 may be modified in such a way that each query consists of x vectors of size r each, each of which correspond to the distances of r chosen points from a different central point.

Variation 2 can be given an extra layer of security, in applications where it is possible that the server and the client share a secret permutation known only to them. The server, while sending the queries, each of which is a pair of vectors, would permute the second vector in the pair according to the secret permutation. The client would de-permute the second vector of each query and then proceed as before.

In addition to the proposed variations above, the operation of the authentication process can be further enhanced by improving the accuracy of the protocol. The accuracy of the protocol is affected by the spurious minutiae that are thrown-in by the minutiae extraction software due to image noise. If the minutiae $p^i_0$, used in the construction of query i, is spurious, then it is not possible for this query to be useful in the authentication process. This illustrates how spurious minutiae reduce the chances of successful authentication by a client that is correctly following the protocol. One enhancement deals with this difficulty by reducing the number of spurious minutiae in the image in the server's database.

In this enhancement, at the time of registration of the user, when the user's fingerprint is added to the server's database, several images of the user's fingerprint are acquired. These images are then considered pairwise, and the minutiae present in one image of such pairs are sought to be matched with the minutiae in the other image of the pair. Such a matching may be done either manually or using a software. If a minutia a in the first image matches minutiae b in the second, then minutiae a and b are to be regarded as non-spurious.

The fingerprint that is to be stored in the server's database is derived from one of the several images. This is done by dropping from the image all minutiae, which did not match with any minutiae in other images in the process described above.

What is claimed is:

1. A method for enabling the remote authentication of fingerprints over an insecure network using a client-server architecture, comprising:

transmitting the identity of the finger-print source to the server, retrieving the fingerprint pattern data of the fingerprint source from the fingerprint data-base at the server, transmitting a set of queries, each of which is derived from a randomly selected set of fingerprint pattern elements in said fingerprint pattern, to said client, comparing the received set of queries against the observed fingerprint pattern at the client, transmitting the identities of those queries to the server for which a match is observed by the client provided at least a defined minimum number of queries are verified, generating a set of challenges pertaining to defined physical relationships between fingerprint pattern elements in the identified queries, transmitting said challenges to said client, responding to said challenges based on observed fingerprint patterns at the client, and confirming authentication provided at least a defined minimum proportion of responses are determined to be correct by the server.

2. The method as claimed in claim 1, wherein said identities are the indices of those queries for which a fingerprint pattern match is observed by said client.

3. The method as claimed in claim 1, wherein each of said queries consists of geometric information about the corresponding randomly selected set of fingerprint pattern elements.

4. The method as claimed in claim 3, wherein each of said queries consists of distances between pairs of fingerprint pattern elements.

5. The method as claimed in claim 3, wherein each of the said queries consists of the distances from a chosen fingerprint pattern element to each of the other fingerprint pattern elements.

6. The method as claimed in claim 5, wherein said distance is the Euclidean distance or the Ridge-Count distance between said two points or a cartesian pair of values, the two values being the Euclidean and the Ridge-Count distances respectively.

7. The method as claimed in claim 1, wherein each of the said challenges pertains to a geometric relationship between fingerprint pattern elements in the identified queries.

8. The method as claimed in claim 1, wherein the said client attempts to maximize the number of correct responses to said challenges.

9. The method as claimed in claim 1, wherein the minimum number of matches to said queries is 3 and said challenges are constructed by grouping the elements of said identified or matched queries into ordered 3-tuples each containing one element respectively from the 3 identified queries, the correct response to which is the angle formed by connecting the 3 points in said 3-tuple in a predefined sequence.

10. The method as claimed in claim 9, wherein in order to make the protocol more robust to noisy inputs, the minimum number of matches to said queries is increased to 6 and said challenges are constructed by picking 6 pattern elements, one from each query and selecting 4 angles formed by these 6 elements, chosen in a manner devised not to reveal any useful information about said fingerprint to an eavesdropper.

11. The method as claimed in claim 1, wherein in order to improve security, said queries are transmitted as pairs of vectors with the second vector in the pair being permuted in accordance with a secret permutation known only to said client and said server, with the client de-permuting said vector of each query prior to processing.

12. The method as claimed in claim 1, wherein to improve accuracy by rejecting spurious patterns said server acquires several images of the fingerprint of the user at the time of registration, said fingerprint patterns are considered pair wise, and the fingerprint pattern elements present in one image are matched with corresponding elements in the other, and only those elements that match are stored in said fingerprint database at the server.

13. A system for enabling the remote authentication of fingerprints over an insecure network using a client-server architecture, comprising:
  means for transmitting the identity of the finger-print source to the server,
  means for retrieving the fingerprint pattern data of the fingerprint source from the fingerprint data-base at the server,
  means for transmitting a set of queries, each of which is derived from a randomly selected set of fingerprint pattern elements in said fingerprint pattern, to said client,
  means for comparing the received set of queries against the observed fingerprint pattern at the client,
  means for transmitting the identities of those queries to the server for which a match is observed by the client provided at least a defined minimum number of queries are verified,
  means for generating a set of challenges pertaining to defined physical relationships between fingerprint pattern elements in the identified queries,
  means for transmitting said challenges to said client,
  means for responding to said challenges based on observed fingerprint patterns at the client, and
  means for confirming authentication provided at least a defined minimum proportion of responses are determined to be correct by the server.

14. The system as claimed in claim 13, wherein said identities are the indices of those queries for which a fingerprint pattern match is observed by said client.

15. The system as claimed in claim 13, wherein said means for transmitting queries uses the geometric information about the corresponding randomly selected set of fingerprint pattern elements.

16. The system as claimed in claim 15, wherein said means for transmitting queries uses the distances between pairs of fingerprint pattern elements.

17. The system as claimed in claim 15, wherein said means for transmitting queries uses the distances from a chosen fingerprint pattern element to each of the other fingerprint pattern elements.

18. The system as claimed in claim 17, wherein said distance is the Euclidean distance or the Ridge-Count distance between said two points or a cartesian pair of values, the two values being the Euclidean and the Ridge-Count distances respectively.

19. The system as claimed in claim 13, wherein said means for generating challenges uses a geometric relationship between fingerprint pattern elements in the identified queries.

20. The system as claimed in claim 13, wherein said client attempts to maximize the number of correct responses to said challenges.

21. The system as claimed in claim 13, wherein the minimum number of matches to said queries is 3 and said means for generating challenges groups the elements of said identified matched queries into ordered 3-tuples each containing one element respectively from the 3 identified queries, the correct response to which is the angle formed by connecting the 3 points in said 3-tuple in a predefined sequence.

22. The system as claimed in claim 21, wherein in order to make the protocol more robust to noisy inputs the minimum number of matches to said queries is increased to 6 and said means for generating challenges picks 6 pattern elements, one from each query and select 4 angles formed by these 6 elements, chosen in a manner devised not to reveal any useful information about said fingerprint to an eavesdropper.

23. The system as claimed in claim 13, wherein in order to improve security, said means for transmitting queries constructs queries as a pair of vectors with the second vector in the pair being permuted in accordance with a secret permutation known only to said client and said server, with the client de-permuting said vector of each query prior to processing.

24. The system as claimed in claim 13, wherein to improve accuracy by rejecting spurious patterns said server acquires several images of the fingerprint of the user at the time of registration includes means for considering said fingerprint patterns pair wise, and the means for matching the fingerprint pattern elements present in one image with corresponding elements in the other, said server storing only those elements that match in said fingerprint database.

25. A computer program product comprising computer readable program code stored on computer readable storage medium embodied therein for enabling the remote authentication of fingerprints over an insecure network using a client-server architecture, comprising:
  computer readable program code means configured for transmitting the identity of the finger-print source to the server,
  computer readable program code means configured for retrieving the fingerprint pattern data of the fingerprint source from the fingerprint data-base at the server, computer readable program code means configured for transmitting a set of queries, each of which is derived from a randomly selected set of fingerprint pattern elements in said fingerprint pattern, to said client, computer readable program code means configured for comparing the received set of queries against the observed fingerprint pattern at the client, computer readable program code means configured for transmitting the identities of said queries to the server for which a match is observed by the client provided at least a defined minimum number of queries are verified, computer readable program code means configured for generating a set of challenges pertaining to defined physical relationships between fingerprint pattern elements in the identified queries, computer readable program code means configured for transmitting said challenges to said client, computer readable program code means configured for responding to said challenges based on observed fingerprint patterns at the client, and computer readable program code means configured for confirming authentication provided at least a defined minimum proportion of responses are determined to be correct by the server.

26. The computer program product as claimed in claim 25, wherein said identities are the indices of those queries for which a fingerprint pattern match is observed by said client.

27. The computer program product as claimed in claim 25, wherein said computer readable program code means configured for transmitting queries uses the geometric information about the corresponding randomly selected set of fingerprint pattern elements.

28. The computer program product as claimed in claim 27, wherein said computer readable program code means configured for transmitting queries uses the distances between pairs of fingerprint pattern elements.

29. The computer program product as claimed in claim 27, wherein said computer readable program code means configured for transmitting queries uses the distances from a chosen fingerprint pattern element to each of the other fingerprint pattern elements.

30. The computer program product as claimed in claim 29, wherein said distance is the Euclidean distance or the Ridge-Count distance between said two points or a cartesian pair of values, the two values being the Euclidean and the Ridge-Count distances respectively.

31. The computer program product as claimed in claim 25, wherein said means for generating challenges pertains to a geometric relationship between fingerprint pattern elements in the identified queries.

32. The computer program product as claimed in claim 25, wherein said client attempts to maximize the number of responses to said challenges.

33. The computer program product as claimed in claim 25, wherein the minimum number of matches to said queries is 3 and said computer readable program code means configured for generating challenges groups the elements of said identified matched queries into ordered 3-tuples each containing one element respectively from the 3 identified queries, the correct response to which is the angle formed by connecting the 3 points in said 3-tuple in a predefined sequence 34. The computer program product as claimed in claim 33, wherein in order to make the protocol more robust to noisy inputs the minimum number of matches to said queries is increased to 6 and said computer readable program code means configured for generating challenges picks 6 pattern elements, one from each query and select 4 angles formed by these 6 elements, chosen in a manner devised not to reveal any useful information about said fingerprint to an eavesdropper.

35. The computer program product as claimed in claim 25, wherein in order to improve security said computer readable program code means configured for transmitting queries constructs queries as pairs of vectors with the second vector in the pair being permuted in accordance with a secret permutation known only to said client and said server, with the client de-permuting said vector of each query prior to processing.

36. The computer program product as claimed in claim 25, wherein to improve accuracy by rejecting spurious patterns said server acquires several images of the fingerprint of the user at the time of registration includes computer readable program code means configured for considering said fingerprint patterns pair wise, and the computer readable program code means for matching the fingerprint pattern elements present in one image with corresponding elements in the other, said server storing only those elements that match in said fingerprint database.

* * * * *